United States Patent
Nykamp et al.

(10) Patent No.: US 10,124,827 B2
(45) Date of Patent: Nov. 13, 2018

(54) METHODS AND APPARATUSES FOR DETERMINING ESTIMATES OF A VEHICLE'S WHEEL ANGLE AND THE VEHICLE'S STEERING RATIO

(71) Applicant: Deere & Company, Moline, IL (US)

(72) Inventors: Alex Nykamp, Urbandale, IA (US); Joshua Lawson, St. Paul, MN (US)

(73) Assignee: DEERE & COMPANY, Moline, IL (US)

( * ) Notice: Subject to any disclaimer, the term of this patent is extended or adjusted under 35 U.S.C. 154(b) by 81 days.

(21) Appl. No.: 15/252,809

(22) Filed: Aug. 31, 2016

(65) Prior Publication Data

US 2018/0057046 A1 Mar. 1, 2018

(51) Int. Cl.
*B62D 6/00* (2006.01)
*B62D 5/04* (2006.01)
*B62D 15/02* (2006.01)
*G05D 1/02* (2006.01)

(52) U.S. Cl.
CPC ............. *B62D 6/005* (2013.01); *B62D 5/046* (2013.01); *B62D 15/02* (2013.01); *B62D 15/022* (2013.01); *G05D 1/021* (2013.01); *G05D 2201/0213* (2013.01)

(58) Field of Classification Search
CPC ........ B62D 6/005; B62D 5/046; B62D 15/02; B62D 15/022; G05D 1/021; G05D 2201/0213
See application file for complete search history.

(56) References Cited

U.S. PATENT DOCUMENTS

| | | | | |
|---|---|---|---|---|
| 5,245,422 A | * | 9/1993 | Borcherts | G05D 1/0246 348/119 |
| 5,607,028 A | * | 3/1997 | Braun | B62D 7/1509 180/24.01 |
| 6,901,319 B1 | | 5/2005 | Nelson et al. | |
| 6,907,336 B2 | * | 6/2005 | Gray | A01B 69/008 172/2 |
| 2002/0188389 A1 | * | 12/2002 | Ashrafi | G01M 17/06 701/41 |
| 2003/0019685 A1 | * | 1/2003 | Graber | B62D 5/003 180/402 |
| 2004/0200661 A1 | * | 10/2004 | Sugitani | B62D 6/008 180/402 |
| 2005/0240327 A1 | * | 10/2005 | Kato | B62D 5/008 701/41 |
| 2006/0041364 A1 | | 2/2006 | Tsukasaki et al. | |
| 2006/0048976 A1 | * | 3/2006 | Deguchi | B60L 15/2036 180/6.5 |

(Continued)

OTHER PUBLICATIONS

Extended European Search Report dated Jan. 31, 2018.

*Primary Examiner* — Calvin Cheung
(74) *Attorney, Agent, or Firm* — Harness, Dickey & Pierce, P.L.C.

(57) ABSTRACT

In an example embodiment, a vehicle guidance system includes a memory including computer-readable instructions stored therein and a processor. The processor is configured to execute the computer-readable instructions to estimate a wheel angle of a vehicle based on at least a first value, the first value being a hand wheel based estimate of the wheel angle, and adjust steering commands for steering the vehicle based on the estimated wheel angle to permit the vehicle to move along a set path.

16 Claims, 5 Drawing Sheets

(56) References Cited

U.S. PATENT DOCUMENTS

| | | | |
|---|---|---|---|
| 2007/0265752 A1* | 11/2007 | Hayama | B62D 6/003 701/41 |
| 2008/0109133 A1* | 5/2008 | Bedner | B62D 6/002 701/41 |
| 2010/0106375 A1* | 4/2010 | Ahmed | B62D 3/12 701/42 |
| 2012/0046806 A1 | 2/2012 | Yokota et al. | |
| 2012/0215395 A1* | 8/2012 | Aznavorian | G05D 1/021 701/25 |
| 2015/0142269 A1* | 5/2015 | Kaufmann | B62D 5/0463 701/41 |
| 2016/0137225 A1* | 5/2016 | Tarum | B62D 15/0245 701/41 |

* cited by examiner

METHODS AND APPARATUSES FOR DETERMINING ESTIMATES OF A VEHICLE'S WHEEL ANGLE AND THE VEHICLE'S STEERING RATIO

FIELD

Example embodiments are related to systems and methods for estimating a vehicle's wheel angle and the vehicle's steering ratio for guiding the vehicle.

BACKGROUND

A universal guidance system installed on a vehicle (e.g., a heavy duty vehicle such as a tractor, etc.) typically utilizes a wheel sensor to estimate a wheel angle of each wheel of the vehicle. The estimated wheel angle and the vehicle's steering ratio is utilized by the universal guidance system to control and guide the movement of the vehicle.

Conventionally, the wheel angle estimation is performed by attaching one wheel sensor to one wheel (e.g., left or right front tire) of the vehicle. Such sensors are typically costly and introduce system installation complexities. Furthermore, such sensors may have high warranties provided by a manufacturer, which may potentially introduce additional financial burden on the manufacturer.

Currently, control systems deployed on a vehicle do not estimate the vehicle's steering ratio but rather have a default steering ratio hardcoded into the system. Such hardcoded steering ratio cannot be modified, which would translate into the user of vehicle having to manually adjust the gains of the vehicle to improve performance of the vehicle.

SUMMARY

Some embodiments are directed to methods and apparatuses for disturbance and stability detection by a vehicle guidance system in guiding a vehicle.

In an example embodiment, a vehicle guidance system includes a memory including computer-readable instructions stored therein and a processor. The processor is configured to execute the computer-readable instructions to estimate a wheel angle of a vehicle based on at least a first value, the first value being a hand wheel based estimate of the wheel angle, and adjust steering commands for steering the vehicle based on the estimated wheel angle to permit the vehicle to move along a set path.

In an example embodiment, a method includes estimating a wheel angle of a vehicle based on at least a first value, the first value being a hand wheel based estimate of the wheel angle, and adjusting steering commands for steering the vehicle based on the estimated wheel angle to permit the vehicle to move along a set path.

BRIEF DESCRIPTION OF THE DRAWINGS

Example embodiments will be more clearly understood from the following detailed description taken in conjunction with the accompanying drawings.

FIG. 1 is a block diagram of a vehicle steering system, according to an example embodiment;

FIG. 2 is a block diagram of a vehicle steering system, according to an example embodiment;

FIG. 3 illustrates a method of determining an estimate of a wheel angle of a vehicle and adjusting steering commands based thereon, according to an example embodiment;

FIG. 4 illustrates a method of determining an estimate of the wheel angle of FIG. 1, according to an example embodiment; and FIG. 5 illustrates a method of determining an estimate of the vehicle's steering ratio, according to an example embodiment.

DETAILED DESCRIPTION

Figure 1:
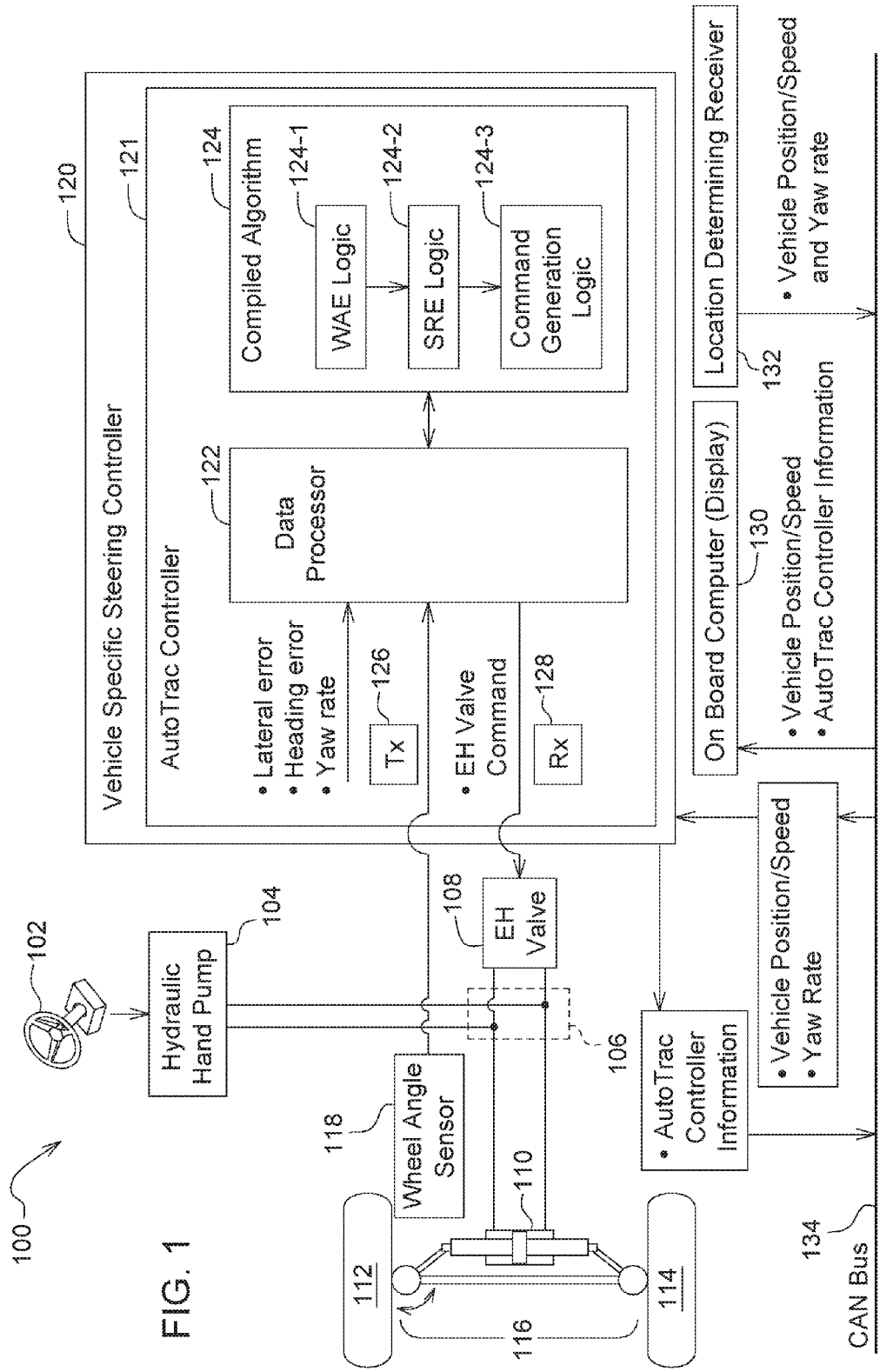
FIGS. 1-5 represent non-limiting, example embodiments as described herein.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Some embodiments are directed to methods and apparatuses for disturbance and stability detection by a vehicle guidance system in guiding a vehicle.

In an example embodiment, a vehicle guidance system includes a memory including computer-readable instructions stored therein and a processor. The processor is configured to execute the computer-readable instructions to estimate a wheel angle of a vehicle based on at least a first value, the first value being a hand wheel based estimate of the wheel angle, and adjust steering commands for steering the vehicle based on the estimated wheel angle to permit the vehicle to move along a set path.

In yet another example embodiment, the processor is further configured to execute the computer-readable instructions to determine the first value based on an angle of the hand wheel and a vehicle steering ratio.

In yet another example embodiment, the processor is further configured to execute the computer-readable instructions to receive information on the angle of the hand wheel from an encoder installed on the hand wheel.

In yet another example embodiment, the processor is further configured to execute the computer-readable instruction to determine the vehicle steering ratio based on a position of the hand wheel and a yaw rate of the vehicle.

In yet another example embodiment, the processor is further configured to execute the computer-readable instructions to receive the yaw rate from a positioning sensor.

In yet another example embodiment, the processor is further configured to execute the computer-readable instructions to determine a second value based on the received yaw rate, a vehicle wheel base value and a speed of the vehicle, the second value being a yaw rate based estimate of the wheel angle, and estimate the wheel angle based on the first value and the second value.

In yet another example embodiment, the processor is further configured to execute the computer-readable instructions to determine the vehicle steering ratio as a ratio of a change in the position of the hand wheel and a change in the second value.

In yet another example embodiment, the processor is further configured to execute the computer-readable instructions to determine a system bias value based on the first and second value, and estimate the wheel angle as a sum of the first value and the determined system bias value.

In yet another example embodiment, the processor is further configured to execute the computer-readable instructions to determine the system bias value by determining a difference between the first value and the second value, and determining the system bias value as a ratio of the difference to a bias factor.

In yet another example embodiment, the processor is further configured to execute the computer-readable instructions to determine if a yaw rate of the vehicle is accurate, determine the system bias value if the yaw rate is accurate, and determine the wheel angle to be equal to the first value if the yaw rate is not accurate.

In an example embodiment, a method includes estimating a wheel angle of a vehicle based on at least a first value, the first value being a hand wheel based estimate of the wheel angle, and adjusting steering commands for steering the vehicle based on the estimated wheel angle to permit the vehicle to move along a set path.

In yet another example embodiment, the method further includes determining the first value based on an angle of the hand wheel and a vehicle steering ratio.

In yet another example embodiment, the method further includes receiving information on the angle of the hand wheel from an encoder installed on the hand wheel.

In yet another example embodiment, the method further includes determining the vehicle steering ratio based on a position of the hand wheel and a yaw rate of the vehicle.

In yet another example embodiment, the method further includes receiving the yaw rate from a positioning sensor.

In yet another example embodiment, the method further includes determining a second value based on the received yaw rate, a vehicle wheel base value and a speed of the vehicle, the second value being a yaw rate based estimate of the wheel angle, wherein the estimating includes estimating the wheel angle based on the first value and the second value.

In yet another example embodiment, the determining of the vehicle steering ratio includes determining the vehicle steering ratio as a ratio of a change in the position of the hand wheel and a change in the second value.

In yet another example embodiment, the method further includes determining a system bias value based on the first and second value, wherein the estimating includes estimating the wheel angle as a sum of the first value and the determined system bias value.

In yet another example embodiment, the determining the system bias includes determining a difference between the first value and the second value, and determining the system bias value as a ratio of the difference to a bias factor.

In yet another example embodiment, determining if a yaw rate of the vehicle is accurate, the determining the system bias value determining the system bias value if the yaw rate is accurate, and determining the wheel angle to be equal to the first value if the yaw rate is not accurate.

As mentioned in the Background Section, a universal guidance system of a vehicle (or a universal guidance solution implemented by a control system of the vehicle) utilizes an estimate of the vehicle's wheel angle in order to control and guide the vehicle's movement.

Currently, sensors are utilized to estimate the vehicle's wheel angle. Such sensors are costly, have high warranties and introduce system installation complexities for the manufacturer of the vehicle.

Furthermore, said universal guidance systems do not currently estimate a vehicle's steering ratio, which results in the vehicle guidance system having to be manually tuned depending on specific vehicle parameters.

Example embodiments described herein enable the determination of an estimate of the vehicle's wheel angle without using a sensor on the vehicle's wheels. This would in turn enable a manufacturer to ultimately eliminate sensors from being installed on a vehicle's wheels, thus reducing costs and system installation complexities for the manufacturer of the vehicle.

Example embodiments described herein further enable a determination of an estimate of the vehicle's steering ratio, thus relieving the user of the vehicle from having to manually adjust the gains of the vehicle control system/universal guidance system depending on vehicle's specific parameters.

The vehicle referenced in example embodiments throughout this application includes, but is not limited to, heavy duty and off-road vehicles such as tractors, agricultural vehicles used for harvesting crops, tractor loaders, etc.

FIG. 1 is a block diagram of a vehicle steering system, according to an example embodiment.

A vehicle steering system 100 shown in FIG. 1 includes a steering wheel 102. In one example embodiment, the steering wheel 102 is coupled in a known manner to a conventional hydraulic hand pump 104. The hydraulic hand pump 104 is hydraulically connected to a hydraulic combiner or "T" unit 106. In one example embodiment, an electro-hydraulic steering valve (E-H valve) 108 is also connected hydraulically to the T unit 106.

In one example embodiment, the hydraulic hand pump 104 and the E-H valve 108 are commercially available. In one example embodiment, the T unit 106 combines the flows from hydraulic hand pump 104 and the E-H valve 108 and supplies the combined flows to a conventional steering cylinder 110, which controls the angle of the wheels 112 and 114 through a conventional steering linkage 116. The wheels 112 and 114 may be front or rear wheels.

As shown in FIG. 1, a wheel angle sensor 118 is coupled to the wheel 112. In one example embodiment, the wheel angle sensor 118 generates a wheel angle signal. In one example embodiment, the wheel angle sensor 118 is a flow meter type sensor, such as described in abandoned—U.S. patent application Ser. No. 10/170,610, filed on 12 Jun. 2002, the entire content of which is incorporated herein by reference. However, example embodiments are not limited to a flow meter type sensor and may be any other known or to be developed sensor. In one example embodiment, there may be another wheel angle sensor just like the wheel angle sensor 118 attached to the wheel 114 as well. Such wheel angle sensor may function in the same manner as the wheel angle sensor 118 described above. In one example embodiment, the wheel angle sensor may transmit the generated signal(s) to a vehicle control system 120, which will be described below.

While FIG. 1 illustrates that the vehicle steering system 100 includes the wheel angle sensor 118, the inclusion of the wheel angle sensor 118 is not necessary since example embodiments, described below with reference to FIGS. 3-5, enable determining the vehicle's wheel angle estimate without the need for the wheel angle sensor 118.

The vehicle control system 120 (which may hereinafter be also referred to as the vehicle guidance system 120), may include among other components, an AutoTrac controller 121. In one example embodiment, the AutoTrac controller 121 includes a processor 122, a memory 124, a transmitter 126 and a receiver 128. In one example embodiment, the processor 122, the memory 124, the transmitter 126 and the receiver 128 are connected to each other for exchange of data/information therebetween.

The vehicle control system 120 is installed in the vehicle or alternatively, in a towed implement attached to the vehicle, if the implement is equipped with a location-determining receiver 132, which will be further described below.

The processor 122 may be any known, or to be developed, processor installed in the vehicle control system 120. In one example embodiment, the memory 124 may have, among other instructions, a set of instructions stored thereon, for determining an indicator indicative of a condition in which the vehicle is operating and adjusting control gains of the vehicle steering system 100 to ensure a stable performance of the vehicle in said condition, which will be further described with reference to FIGS. 3 and 4.

In one example embodiment, the set of instructions stored on the memory 124 may be separated/grouped into logical units such as the wheel angle estimation (WAE) logic 124-1, the steering ratio estimation (SRE) logic 124-2 and the command generation logic 124-3, all of which will be described below.

In one example embodiment, the processor 122 is configured to execute the set of instructions stored on the memory 124 for performing the disturbance and stability detection. Accordingly and by executing the set of instructions, the processor 122 is transformed into a special purpose processor for carrying out the disturbance and stability detection process. The receiver 126 and the transmitter 128 may be any known, or to be developed, receiver and transmitter, respectively, for communicating with one or more additional components of the vehicle steering system 100 such as the E-H valve 108 or display 130 and/or a location-determining receiver 132 (both of which will be described below).

The display 130 may be any known, or to be developed, display that is installed inside the vehicle's cockpit, through which various types of information may be displayed for a user of the vehicle and/or various type of information may be entered by the user of the vehicle using the display 130.

The location-determining receiver 132 may be any known, or to be developed, receiver capable of providing information on a yaw rate and a yaw angle of the vehicle, a position of the vehicle, a lateral error and a heading angle error associated with the vehicle, etc. The location-determining receiver 132 may be a Global Positioning System Receiver (GPS) with or without differential correction or another satellite navigation receiver.

In one example embodiment, the location-determining receiver 132 provides any one of the following vehicle data, including but not limited to, vehicle's position data, vehicle's velocity data, vehicle's acceleration data, vehicle's yaw angle (e.g., heading), vehicle's tilt angle, vehicle's roll angle and vehicle's yaw rate, where a yaw rate is a rate of change in the yaw angle with respect to time.

In one example embodiment, the lateral error is defined as the difference between a planned path or target path of the vehicle and an actual position of the vehicle as measured by the location-determining receiver 132 at any given time. For example, a target line may be a generally straight line between two designated points (e.g., A-B line established by three dimensional coordinates of the location-determining receiver 132) or substantially parallel thereto, or a curved line that is parallel to an outer boundary of a work area or a field. Accordingly and in one example embodiment, the error in the heading angle is determined based on target heading angle versus the observed heading angle measured by the location-determining receiver 132 at any given time.

The vehicle steering system 100 may further include a control area bus (CAN) 134 through which various information may be exchanged between the vehicle control system 120 (or the receiver 128), the display 130 and the location-determining receiver 132, as shown in FIG. 1.

Figure 2:
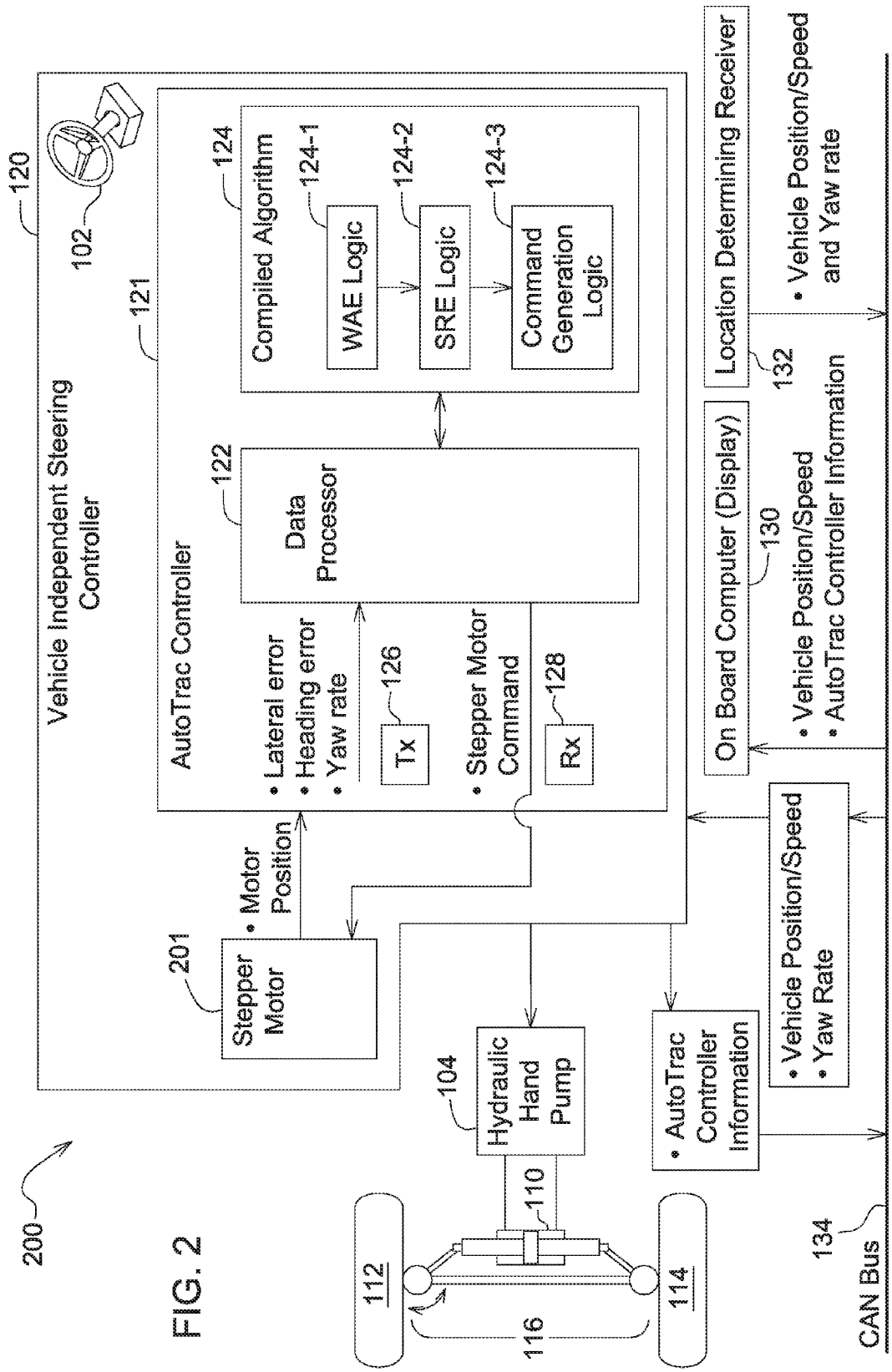

FIG. 2 is a block diagram of a vehicle steering system, according to an example embodiment.

The vehicle steering system 200 shown in FIG. 2 is similar to the vehicle steering system 100 of FIG. 1 in that elements 102, 104, 110, 112, 114, 116, 120, 121, 122, 124, 124-1, 124-2, 124-3, 126, 128, 130, 132 and 134 of the vehicle steering system 200 are the same as their counterpart elements (with the same reference numerals) of the vehicle steering system 100 of FIG. 1. Therefore and for sake of brevity, these elements will not be described in detail with reference to FIG. 2.

The vehicle steering system 200 in FIG. 2 differs from the vehicle steering system 100 of FIG. 1 in that the vehicle steering system 200 does not have a wheel angle sensor and a E-H valve. Instead the vehicle steering system 200 includes a stepper motor 201, which provides appropriate command(s), upon reception of such commands from the processor 122, to the hydraulic hand pump 104 for guiding and driving the vehicle on which the vehicle steering system 200 is installed.

Figure 3:
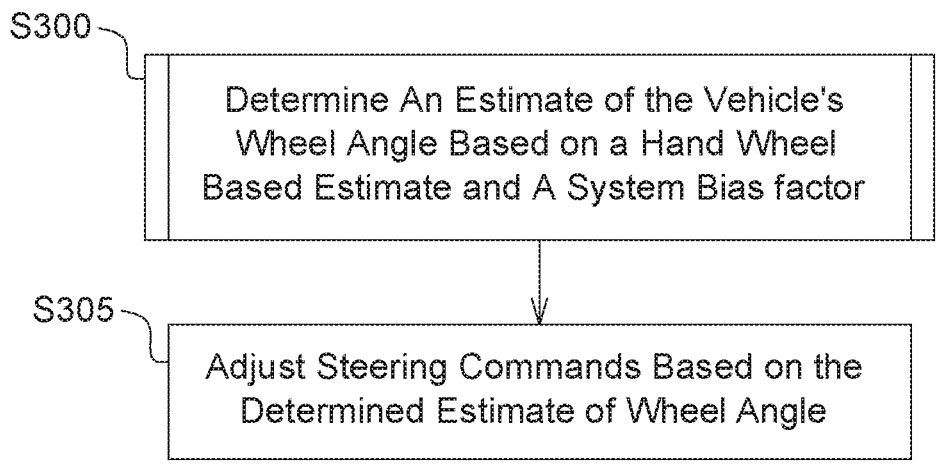

FIG. 3 illustrates a method of determining an estimate of a wheel angle of a vehicle and adjusting steering commands based thereon, according to an example embodiment. FIG. 3 will be described from the perspective of the vehicle control system 120. However, it will be understood that the vehicle control system 120 performs the following function with the aid of the processor 122 executing corresponding computer-readable instructions stored in the memory 124.

At S300, the vehicle control system 120 determines an estimate of a wheel angle of a vehicle on which the vehicle control system is installed. In one example embodiment, the vehicle control system 120 determines the estimate of the wheel angle based on at least one of a hand wheel based estimate of the wheel angle or a sum of the hand wheel based estimate of the wheel angle. The determination of the estimate of the wheel angle will be further described with reference to FIG. 4.

At S305, the vehicle control system 120 adjusts steering commands for steering the vehicle based on the determined estimate of the wheel angle of the vehicle.

In one example embodiment, the vehicle control system 120 may have a programmed path, provided by a universal guidance system, for the vehicle to move along. The programmed path may be determined by the vehicle control system 120 based on one or more parameters provided by a user of the vehicle (via for example the display 130). Alternatively, the user of the vehicle may provide the path to the vehicle control system 120 (via for example the display 130).

Accordingly, based on the given path and the determined estimate of the wheel angle of the vehicle, the vehicle control system 120 determines whether to adjust one or more steering commands to the E-H valve 108 in FIG. 1 or to the stepper motor 201 in FIG. 2 for steering the vehicle in order to ensure that the vehicle remains on course on the path.

Figure 4:
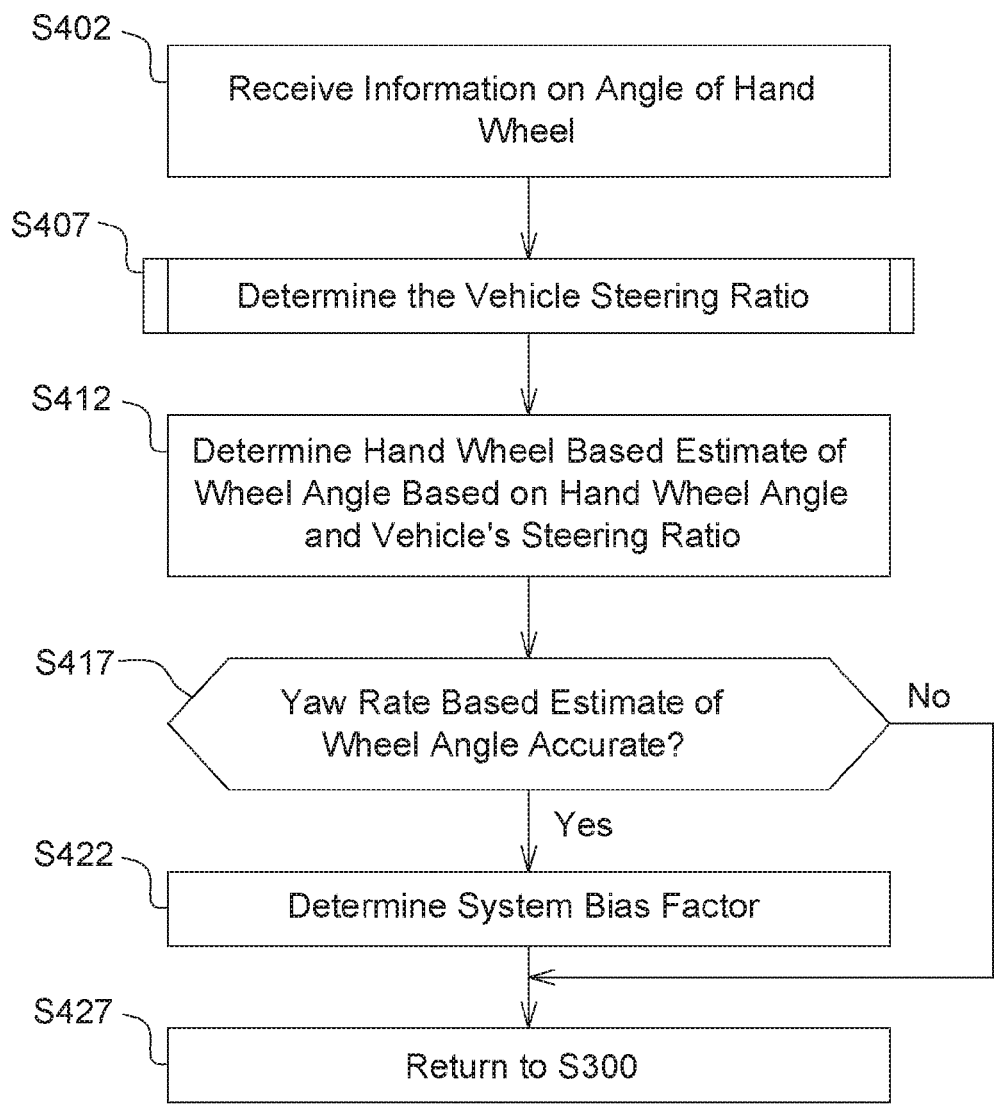

FIG. 4 illustrates a method of determining an estimate of the wheel angle of FIG. 1, according to an example embodiment. FIG. 4 will be described from the perspective of the vehicle control system 120. However, it will be understood that the vehicle control system 120 performs the following function with the aid of the processor 122 executing corresponding computer-readable instructions stored in the memory 124.

At S402, the vehicle control system 120 receives information on an angle of the hand wheel (e.g., hand wheel 102 shown in FIG. 1) of the vehicle. In one example embodiment, the vehicle control system 120 receives the information on the angle of the hand wheel 120 from an encoder installed on the hand wheel 120.

At S407, the vehicle control system 120 determines a vehicle steering ratio for the vehicle. In one example embodiment, the vehicle control system 120 determines the vehicle steering ratio based on a position of the hand wheel 102 and a yaw rate of the vehicle. The determination of the vehicle steering ratio will be further described with reference to FIG. 5.

At S412, the vehicle control system 120 determines a hand wheel based estimate of the wheel angle (first value) based on the angle of the hand wheel 102 received at S402 and the vehicle steering ratio determined at S407. In one example embodiment, the vehicle control system 120 determines the hand wheel based estimate of the wheel angle as a product of the angle of the hand wheel 102 and the determined vehicle steering ratio.

As will be described below with reference to FIG. 5, as part of the process of determining the vehicle steering ratio, the vehicle control system 120 determines a yaw rate based estimate of the wheel angle (second value) based on the vehicle's yaw rate, speed and wheel base value.

At S417, the vehicle control system 120 determines whether the yaw rate based estimate of the wheel angle is accurate. In one example embodiment, the vehicle control system 120 determines the yaw rate based estimate of the wheel angle to be accurate if the yaw rate based estimate of the wheel angle corresponds to a position of the hand wheel 102 (the position of the hand wheel 102 will be described with reference to FIG. 5). In one example embodiment, a filtered yaw rate based estimate of the wheel angle corresponds to the position of the hand wheel 102 if a difference in values of the filtered yaw rate based estimate of the wheel angle and the position of the hand wheel 102 is less than a threshold. In one example embodiment, the threshold is a reconfigurable value that may be determined/modified based on experiments, empirical studies and or a user input.

If at S417, the vehicle control system 120 determines that the yaw rate based estimate of the wheel angle is accurate, then at S422, the vehicle control system 120 determines a system bias factor for the vehicle control system 120.

In one example embodiment, the vehicle control system 120 determines the system bias factor based on the hand wheel based estimate of the wheel angle (first value), the yaw rate based estimate of the wheel angle (second value) and a bias scale factor (bias factor). In one example embodiment, the bias scale factor is a constant parameter that is reconfigurable and may be determined based on empirical studies and/or experiments. The bias scale factor may be encoded into the vehicle control system 120 by the manufacturer or by a user of the vehicle. The bias scale factor may be reconfigured at any time by the user of the vehicle.

In one example embodiment, the vehicle control system 120 determines a difference between yaw rate based estimate of the wheel angle (second value) and the hand wheel based estimate of the wheel angle (first value). Furthermore, the vehicle control system 120 determines the system bias factor as a ratio of the determined difference to the bias scale factor.

Thereafter, at S427, the process reverts back to S300 and the vehicle control system 120 determines the estimate of the wheel angle of the vehicle as a sum of the hand wheel based estimate of the wheel angle and the determined system bias factor.

However, if at S417, the vehicle control system 120 determines that the yaw rate based estimate of the wheel angle is not accurate, then the process reverts back to S300, where the vehicle control system 120 determines the estimate of the wheel angle of the vehicle to be equal to the hand wheel based estimate of the wheel angle (first value) only.

Figure 5:
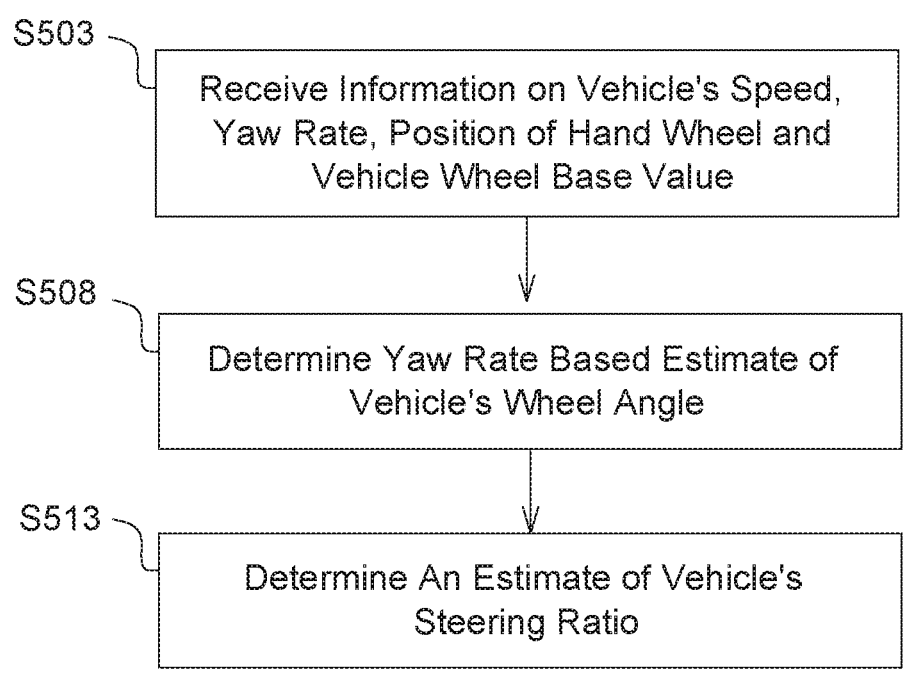

FIG. 5 illustrates a method of determining an estimate of the vehicle's steering ratio, according to an example embodiment. FIG. 5 will be described from the perspective of the vehicle control system 120. However, it will be understood that the vehicle control system 120 performs the following function with the aid of the processor 122 executing corresponding computer-readable instructions stored in the memory 124.

At S503, the vehicle control system 120 receives information corresponding to a speed of the vehicle, a yaw rate of the vehicle, a position of the hand wheel 102 and a vehicle wheel base value.

In one example embodiment, the vehicle control system 120 receives the information corresponding to, for example, the speed of the vehicle and the yaw rate of the vehicle, as described above, from the location-determining receiver 132 via the CAN 134.

In one example embodiment, the vehicle control system 120 receives the position of the hand wheel 102 from an encoder installed on the hand wheel 102.

In one example embodiment, the vehicle wheel base value is a constant that may be preconfigured into the vehicle control system 120 by a manufacturer of the vehicle. The vehicle wheel base value may be determined based on experiments and/or empirical studies. In one example embodiment, the vehicle wheel base value is a configurable value that may be changed by a user of the vehicle.

At S508, the vehicle control system 120 determines a yaw rate based estimate of the wheel angle (second value) based on the received yaw rate, the received vehicle wheel base value and the received vehicle speed.

In one example embodiment, the vehicle control system 120 determines a product the received yaw rate and the vehicle wheel base value. The vehicle control system then determines the yaw rate based estimate of the wheel angle as a ratio of the product to the speed of the vehicle received at S503.

Thereafter and at S513, the vehicle control system 120 determines an estimate of the vehicle steering ratio as a ratio of a change in the vehicle's hand wheel position and a change in the yaw rate based estimate of the wheel angle.

In one example embodiment, in order to determine the estimate of the vehicle steering ratio, the vehicle control system 120 determines whether the received yaw rate information and the received hand wheel position are moving in the same direction. If the vehicle control system 120 determines that the received yaw rate and the received hand wheel position are moving in the same direction, the vehicle control system 120 initiates logging of information corresponding to the hand wheel position and the yaw rate based estimate of the wheel angle.

In one example embodiment, as soon as the vehicle control system 120 determines that the received yaw rate and the received hand wheel position are not moving in the same direction, the vehicle control system 120 terminate the logging of said information. Thereafter, the vehicle control system 120 determines the change in the hand wheel position and the change in the yaw rate based estimate of the wheel angle using the already logged information, as described above.

Accordingly and as described above with reference to FIGS. 1-5, the vehicle control system 120 determines estimates of the vehicle wheel angle and the vehicle steering ratio and then utilizes the determined estimate of the vehicle wheel angle to adjust steering commands for steering the vehicle according to the universal guidance system.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A vehicle guidance system comprising:
    a memory including computer-readable instructions stored therein; and
    a processor configured to execute the computer-readable instructions to,
        determine a vehicle steering ratio based on a position of a hand wheel and a yaw rate of the vehicle,
        determine a first value based on an angle of the hand wheel and the vehicle steering ratio,
        estimate a wheel angle of the vehicle based on at least the first value, the first value being a hand wheel based estimate of the wheel angle, and
        adjust steering commands for steering the vehicle based on the estimated wheel angle to permit the vehicle to move along a set path.

2. The vehicle guidance system of claim 1, wherein the processor is further configured to execute the computer-readable instructions to receive information on the angle of the hand wheel from an encoder installed on the hand wheel.

3. The vehicle guidance system of claim 1, wherein the processor is further configured to execute the computer-readable instructions to receive the yaw rate from a positioning sensor.

4. The vehicle guidance system of claim 3, wherein the processor is further configured to execute the computer-readable instructions to,
   determine a second value based on the received yaw rate, a vehicle wheel base value and a speed of the vehicle, the second value being a yaw rate based estimate of the wheel angle, and
   estimate the wheel angle based on the first value and the second value.

5. The vehicle guidance system of claim 4, wherein the processor is further configured to execute the computer-readable instructions to determine the vehicle steering ratio as a ratio of a change in the position of the hand wheel and a change in the second value.

6. A vehicle guidance system comprising:
   a memory including computer-readable instructions stored therein; and
   a processor configured to execute the computer-readable instructions to,
      determine a system bias value based on a first value and a second value, the first value being a hand wheel based estimate of a wheel angle of a vehicle, and
      estimate the wheel angle as a sum of the first value and the determined system bias value, and
      adjust steering commands for steering the vehicle based on the estimated wheel angle to permit the vehicle to move along a set path.

7. The vehicle guidance system of claim 6, wherein the processor is further configured to execute the computer-readable instructions to determine the system bias value by,
   determining a difference between the first value and the second value, and
   determining the system bias value as a ratio of the difference to a bias factor.

8. The vehicle guidance system of claim 6, wherein the processor is further configured to execute the computer-readable instructions to,
   determine if a yaw rate of the vehicle is accurate,
   determine the system bias value if the yaw rate is accurate, and
   determine the wheel angle to be equal to the first value if the yaw rate is not accurate.

9. A method comprising:
   determining a vehicle steering ratio based on a position of a hand wheel and a yaw rate of a vehicle;
   determining a first value based on an angle of the hand wheel and the vehicle steering ratio;
   estimating a wheel angle of the vehicle based on at least the first value, the first value being a hand wheel based estimate of the wheel angle; and
   adjusting steering commands for steering the vehicle based on the estimated wheel angle to permit the vehicle to move along a set path.

10. The method of claim 9, further comprising:
    receiving information on the angle of the hand wheel from an encoder installed on the hand wheel.

11. The method of claim 9, further comprising:
    receiving the yaw rate from a positioning sensor.

12. The method of claim 11, further comprising:
    determining a second value based on the received yaw rate, a vehicle wheel base value and a speed of the vehicle, the second value being a yaw rate based estimate of the wheel angle, wherein the estimating includes estimating the wheel angle based on the first value and the second value.

13. The method of claim 12, wherein the determining of the vehicle steering ratio includes determining the vehicle steering ratio as a ratio of a change in the position of the hand wheel and a change in the second value.

14. A method comprising:
    determining a system bias value based on a first and a second value, the first value being a hand wheel based estimate of a wheel angle,
    estimating the wheel angle as a sum of the first value and the determined system bias value; and
    adjusting steering commands for steering the vehicle based on the estimated wheel angle to permit the vehicle to move along a set path.

15. The method of claim 14, wherein the determining the system bias includes,
    determining a difference between the first value and the second value, and
    determining the system bias value as a ratio of the difference to a bias factor.

16. The method of claim 14, further comprising:
    determining if a yaw rate of the vehicle is accurate, the determining the system bias value determining the system bias value if the yaw rate is accurate, and
    determining the wheel angle to be equal to the first value if the yaw rate is not accurate.

* * * * *